US008886002B2

(12) United States Patent
Hubbard et al.

(10) Patent No.: US 8,886,002 B2
(45) Date of Patent: Nov. 11, 2014

(54) CONNECTOR CARRIER FOR AN OPTICAL FIBRE JOINT ENCLOSURE

(75) Inventors: Paul Hubbard, Cherrybrook (AU); Andrew Ellot Pierce, Cherrybrook (AU)

(73) Assignee: Prysmian Telecom Cables & Systems Australia Pty Ltd, Dee Why, New South Wales (AU)

( * ) Notice: Subject to any disclaimer, the term of this patent is extended or adjusted under 35 U.S.C. 154(b) by 1151 days.

(21) Appl. No.: 12/682,228

(22) PCT Filed: Oct. 9, 2007

(86) PCT No.: PCT/AU2007/001529
§ 371 (c)(1), (2), (4) Date: Jul. 9, 2010

(87) PCT Pub. No.: WO2009/046479
PCT Pub. Date: Apr. 16, 2009

(65) Prior Publication Data
US 2010/0271472 A1    Oct. 28, 2010

(51) Int. Cl.
*G02B 6/00* (2006.01)
*G02B 6/44* (2006.01)

(52) U.S. Cl.
CPC .................. *G02B 6/4442* (2013.01)
USPC ...... 385/135; 348/92; 348/E07.085; 356/73.1

(58) Field of Classification Search
USPC ............ 385/135–139; 348/92, E07.085; 356/73.1
See application file for complete search history.

(56) References Cited

U.S. PATENT DOCUMENTS

| 4,986,762 | A | * | 1/1991 | Keith ........................... 439/131 |
| 5,402,515 | A | | 3/1995 | Vidacovich et al. |
| 5,778,131 | A | | 7/1998 | Llewellyn et al. |
| 5,949,946 | A | * | 9/1999 | Debortoli et al. ............. 385/134 |
| 5,969,294 | A | | 10/1999 | Eberle et al. |

(Continued)

FOREIGN PATENT DOCUMENTS

| GB | 2 282 457 A | 4/1995 |
| WO | WO 01/88587 A1 | 11/2001 |
| WO | WO 2006/050505 A1 | 5/2006 |

OTHER PUBLICATIONS

International Preliminary Report on Patentability in International Application No. PCT/AU2007/001529 issued Apr. 13, 2010 (5 pages).

(Continued)

*Primary Examiner* — Ellen Kim
(74) *Attorney, Agent, or Firm* — Finnegan, Henderson, Farabow, Garrett & Dunner, L.L.P.

(57) ABSTRACT

An optical fiber joint enclosure includes a plurality of carriers for supporting a plurality of optical fiber connectors. At least one carrier is rotatable or pivotable between a first position and a second position, independent of an adjacent carrier. The first position is an in-use orientation of an optical fiber connector and the second position provides improved access to an end face of the optical fiber connector. The carrier itself includes a hub portion, engaging an adjacent hub portion of an adjacent carrier, an arm portion attached to the hub portion, the arm portion supporting the optical fiber connector, and a release member preventing the hub portion from rotating unless the release member is activated. A method includes inspecting, testing or cleaning an end face of the optical fiber connector in situ.

49 Claims, 8 Drawing Sheets

(56) References Cited

U.S. PATENT DOCUMENTS

| | | | |
|---|---|---|---|
| 6,227,718 B1 * | 5/2001 | Harvey et al. | 385/55 |
| 6,550,977 B2 * | 4/2003 | Hizuka | 385/55 |
| 6,786,647 B1 | 9/2004 | Hinds et al. | |
| 7,802,926 B2 * | 9/2010 | Leeman et al. | 385/86 |
| 2006/0093303 A1 | 5/2006 | Reagan et al. | |

OTHER PUBLICATIONS

Supplementary European Search Report, from the European Patent Office in corresponding European Application No. EP 07 81 5334, dated Mar. 14, 2012.

Australian Search Report for International Application No. PCT/AU2007/001529, mailing date Dec. 10, 2007.

\* cited by examiner

CONNECTOR CARRIER FOR AN OPTICAL FIBRE JOINT ENCLOSURE

CROSS REFERENCE TO RELATED APPLICATION

This application is a national phase application based on PCT/AU2007/001529, filed Oct. 9, 2007, the content of which is incorporated herein by reference.

TECHNICAL FIELD

The present invention relates to optical fibre joint enclosures, and more specifically relates to an optical fibre joint enclosure provided with a carrier that holds an optical fibre connector and/or uniter. Furthermore, the present invention relates to a method of inspecting, testing, and cleaning or the like an end face of an optical fibre connector in situ. Moreover, the present invention relates to a connector carrier for an optical fibre joint enclosure.

BACKGROUND ART

Optical fibre is increasingly being used for a variety of broadband applications including voice, video and data transmissions delivered to a subscriber's premises. Fibre optic networks typically include a large number of optical fibre joint enclosures (also referred to as Connectorized Lead-in Joints (CLJ)), which provide locations at which one or more optical fibres are branched from a distribution cable to an end user, commonly referred to as a subscriber. Based on the increase in the number of subscribers and the unique physical attributes of optical fibres, optical fibre joint enclosures are needed for making the branches above as well as for protecting and maintaining optical fibres at these fibre branching locations. In particular, optical fibre joint enclosures are needed for readily facilitating connection of optical fibres from a distribution cable to further optical fibres leading to one or more premises to establish desired optical connections. The optical fibre joint enclosure is also requested to provide adequate protection to the branched optical fibres and the optical connections from exposure to environmental conditions.

Typically, the optical fibre joint enclosure is located in an underground pit, and substantial expertise and experience are normally required to configure the optical connections within the optical fibre joint enclosure in the field. In particular, it is often difficult and constrictive to access and work with optical connections inside an optical fibre joint enclosure in the field.

Increasingly, pre-connectorized optical fibres are used in optical fibre joint enclosures for easier interconnection with optical fibres of drop cables extending to subscriber premises. An optical fibre connector terminates the end of an optical fibre and enables quicker connection and disconnection than optical fibre splicing. Two connectors are used in association to align the cores of two optical fibres ends so that light can pass across the join.

In particular, a connector is a mechanical device which is used to align and join together two or more optical fibres thereby providing a means for attaching to, and decoupling from, a fibre optic receptacle, e.g. an optical fibre joint enclosure. Generally, a connector comprises a long and thin cylinder—named "ferrule"—that is bored through the centre thereof so as to contain the optical fibre. The ferrule acts as a fibre alignment mechanism, therefore the optical fibre is inserted into the ferrule in such a way that the end of the optical fibre is located in correspondence of the ferrule end portion.

Typical examples of connectors are SC, FC, LC, ST, E2000 connectors. For instance, FIG. 6 shows a typical SC connector 700. The SC connector is a snap-in connector that is widely used in single mode systems. The SC connector 700 has a substantially square shape and comprises a ferrule 710 which is surrounded by a connector body 720. The SC connector 700 further comprises a latch 730 for allowing safe coupling of the connector to a uniter.

Typically, an optical fibre connector interconnects with a uniter which is a device positioned at the interface between two optical fibre connectors so as to hold the two optical fibre connectors together in alignment. The uniter is also technically known with the term of "adapter" or "adaptor".

The Applicant has noted that the optical fibre joint enclosures do not provide sufficient space between the base of the optical fibre joint enclosure and the carrier to enable a videoscope probe to be introduced into a uniter end face for inspection of the attached connector end face. Therefore, a typical videoscope for inspection cannot be accommodated with the connectors and uniters in their normal position since no sufficient space is present in the optical fibre joint enclosures.

Currently, when an inspection (for example by using a videoscope) and a cleaning operation of a connector end face (the connector being attached to an optical fibre) housed within an optical fibre joint enclosure has to be carried out, the technician typically needs to remove the connector from the position in which it is physically held within the optical fibre joint enclosure. The connector and associated uniter are held in place by a carrier which mechanically supports the connector and the corresponding uniter. Generally, the carrier is referred to as "uniter patch panel". The technician removes the connector from the uniter associated to the carrier in order to inspect the connector end face. This operation can place undue stress on the optical fibre due to bending thereof, potentially damaging the optical fibre. There is also a danger that adjacent optical fibres, attached to adjacent connectors held in or by the carrier, can be damaged during removing of the connector which is requested to be inspected/cleaned.

In order to carry out desired inspection or cleaning operations and to provide the necessary space for a correct working and positioning of any testing or cleaning apparatus, the Applicant considered a number of possible technical solutions. For instance, the Applicant thought to increase the size of the optical fibre joint enclosure to allow sufficient access between the base of the enclosure and the carrier for inserting a video-scope or any inspection/cleaning device. However, since a joint enclosure has typically to fit within a relatively small underground pit, if the size of the joint enclosure increases too much, there is not sufficient room in the underground pit to accommodate the joint enclosure.

The Applicant has also thought to angle the carrier to allow for adequate access to the uniters from the front of the joint enclosure. However, according to this solution, the optical fibre cable—that is attached to a connector which is plugged into the uniter during normal operation—would be angled in such a way that the optical fibre cable protrudes outside of the joint enclosure and could be damaged when an exterior joint cap of the joint enclosure is re-installed.

The Applicant has perceived the need of providing a method of inspection of an optical fibre connector which can be advantageously carried out in situ without the necessity of removing the optical fibre connector to be inspected from its seat and, moreover, without causing the adjacent optical fibre connectors—which have not to be inspected—to be disconnected or subjected to any movement (e.g. rotation thereof), thereby avoiding the risk of possible damages of the optical fibres and consequent failure of the optical connection.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

DISCLOSURE OF INVENTION

The Applicant has found that the objective mentioned above can be achieved by enabling the individual optical fibre connectors, which are housed within an optical fibre joint enclosure, to be rotated or pivoted independently. The Applicant has found that a rotating or pivoting movement of each individual connector allows sufficient or suitable access to an "end face" of the individual connectors for inspection, testing, cleaning or the like, without having to remove a connector from a carrier. In fact, according to the present invention, access to an end face of a connector is obtained via a uniter attached to the connector, the uniter rotating or pivoting together with the connector.

Therefore, instead of having to remove a connector from its fixed position on a carrier to allow inspection of the connector end face, the present invention allows inspection to be performed with the connector in situ on the carrier, thereby ensuring a controlled bending of the optical fibre and avoiding any damage thereto.

According to a first aspect, the present invention relates to a method of inspecting in situ an end face of an optical fibre connector, the optical fibre connector being supported by a carrier, the method including the step of rotating the carrier independently from any adjacent carrier.

According to the present invention, the term "inspecting" is used both in the description and in the claims to indicate any kind of operation which is carried out for inspecting, testing, cleaning or the like an end face of an optical fibre connector.

According to a second aspect, the present invention relates to an optical fibre joint enclosure including a plurality of carriers, at least one carrier indirectly or directly supporting an optical fibre connector and being pivotable independent of an adjacent carrier.

According to a third aspect, the present invention relates to a carrier for supporting an optical fibre connector in an optical fibre joint enclosure, the carrier comprising a hub portion able to be rotated independent of rotation of an adjacent hub portion, an arm portion indirectly or directly supporting the optical fibre connector, and a release member preventing the hub portion from rotating unless the release member is released or activated.

According to the present invention the inspection of an end face of an optical fibre connector can be carried out easily (for example by using a standard video-scope), due to suitable access to the end face of a connector and without disconnecting the optical fibre cable already connected to one side of the connector. Moreover, the inspection can be carried out on a single connector (a predetermined connector of interest), while any other connector in the same optical fibre joint enclosure is not involved or required to be removed (and therefore there is no need to disconnect or to cause bending of already existing optical fibre connections, which could cause damage thereto). Furthermore, the inspection can be carried out suitably controlling the bending of the optical fibre during rotating or pivoting of the connector (thereby avoiding potential damage to the optical fibre and thus to the optical connection).

BRIEF DESCRIPTION OF FIGURES

The present invention should become apparent from the following description, which is given by way of example only, of some preferred but non-limiting embodiments thereof, described in connection with the accompanying figures.

MODES FOR CARRYING OUT THE INVENTION

Figure 1A:
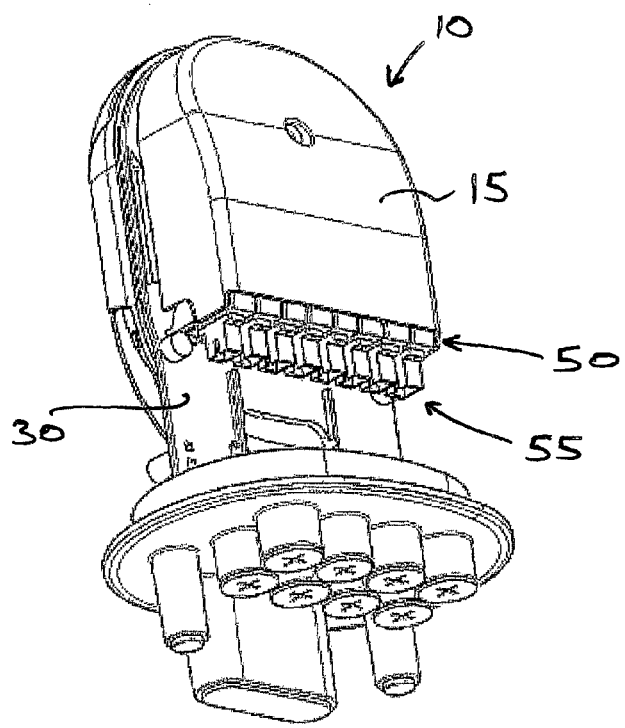
FIG. 1A illustrates a perspective view of an optical fibre joint enclosure (without an exterior protection cover in place for clarity)

The following modes, given by way of example only, are described in order to provide a more precise understanding of the subject matter of the present invention.

In the figures, incorporated to illustrate some features of the embodiments of the present invention, like reference numerals are used to identify like parts throughout the figures.

Referring to FIG. 1A, there is illustrated a perspective view of an optical fibre joint enclosure 10. Optical fibre joint enclosure 10 is illustrated without the usual exterior protection cover in place for clarity. Optical fibre joint enclosure 10 includes pigtail cover 15 that covers and protects internal optical fibre cables. A plurality of carriers 50 is held below pigtail cover 15. Generally, carriers 50 hold the respective connectors by means of respective uniters 55 which receive the connectors thereinto. Each individual carrier 50 is rotatably or pivotably engaged with a support that is attached to spine 30 as described in detail in the following.

Figure 1B:
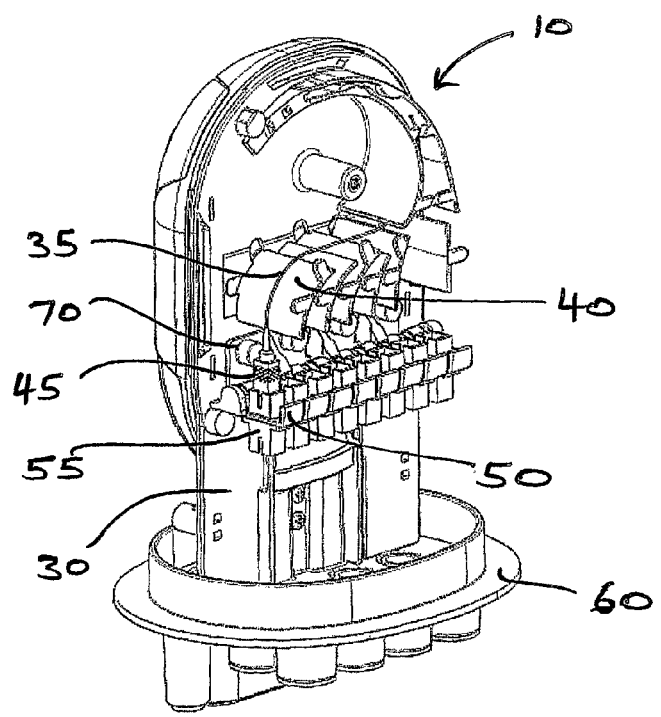
FIG. 1B illustrates the optical fibre joint enclosure of FIG. 1A with the pigtail cover removed.

Referring to FIG. 1B, optical fibre joint enclosure 10 is illustrated without pigtail cover 15. Optical fibre cable 35 follows a pathway over fin 40 and is attached to connector 45 which is supported by carrier 50. Carrier 50 is shown to receive and hold uniter 55, with parts of uniter 55 projecting from opposite sides of carrier 50. Uniter 55 is configured to receive and hold connector 45 as illustrated. Generally, uniter 55 is a separate component that is attached to carrier 50. Alternatively, uniter 55 is integrally formed with carrier 50. Reference to carrier 50 supporting connector 45 includes carrier 50 engaging and supporting connector 45, or, carrier 50 engaging and supporting uniter 55, or part thereof, which in turn engages and supports connector 45.

In FIG. 1B, carriers 50 are shown in a first position for supporting the connectors in an in-use orientation (in the figure only one connector 45 being associated to only one carrier 50). In detail, connector 45 is inserted into uniter 55—for example to make an optical connection to a subscriber's premises—so that, in use, carrier 50 and connector 45 are held in the position illustrated in FIG. 1B.

Figure 1C:
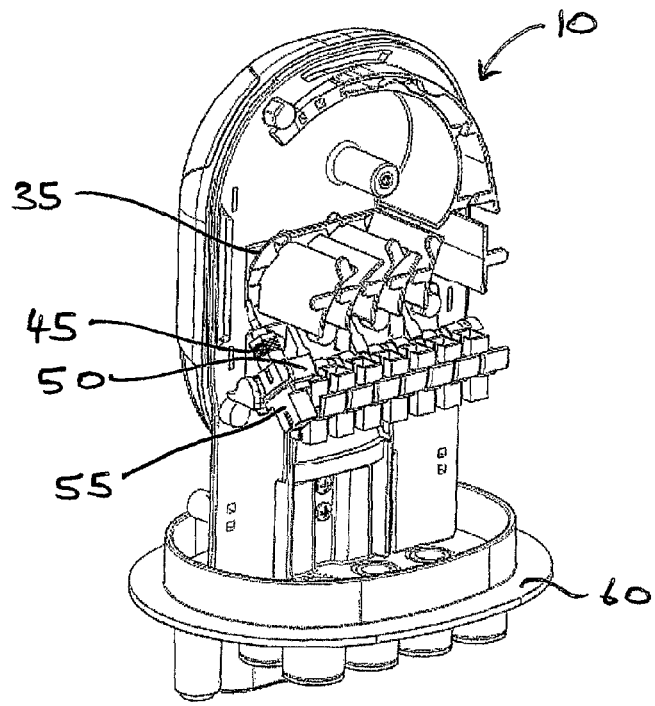
FIG. 1C illustrates the optical fibre joint enclosure of FIG. 1B with one of the carriers rotated to a position for inspecting an end face of the associated connector.

Referring to FIG. 1C, carrier 50 which is associated to connector 45 is illustrated in a second position after carrier 50 has been rotated or pivoted. This second position provides improved access to an end face (not visible in the figures) of connector 45. Improved access is provided as the straight line distance extending along the longitudinal axis of connector 45 is significantly increased due to rotation of carrier 50 and associated rotation of connector 45. In fact, according to the present invention, when carrier 50 is in its rotated position the space to access the end face of connector 45 is not limited by base region 60. Advantageously each carrier 50 is rotated or pivoted independently of any adjacent carrier so that it is possible to operate on each single carrier without interfering with the adjacent ones and the optical connections already present and operating within optical fibre joint enclosure 10.

According to the present invention optical fibre joint enclosure 10 comprises a plurality of carriers 50 for supporting, respectively, a plurality of optical fibre connectors 45, at least one carrier 50 being pivotable between a first position as illustrated in FIG. 1B, and a second position as illustrated in FIG. 1C, where said at least one carrier is independent of any carrier adjacent thereto so that pivoting of said at least one carrier can be carried out independently. Preferably, all carriers 50 possessed by optical joint enclosure 10 are independently rotatable or pivotable.

According to the present invention the method of inspecting an end face of an optical fibre connector is advantageously carried out in situ without the need for connector 45 to be removed from either carrier 50 or uniter 55. Preferably, access to the end face of connector 45 is obtained via uniter 55 which rotates or pivots in unison with carrier 50 and connector 45. A technician can rotate carrier 50 from a first position, as illustrated in FIG. 1B, to a second position of carrier 50, as illustrated in FIG. 1C. Inspection of the end face of connector 45 is suitably undertaken while carrier 50 is in the second position, as illustrated in FIG. 1C. After completion of the inspection carrier 50 is rotated back to the first position, as illustrated in FIG. 1B. As already mentioned above, this provides a method of inspecting the end face of a connector in situ, which is independent of having to move or disconnect the connector to be inspected from any connector adjacent thereto 65.

Figure 2A:
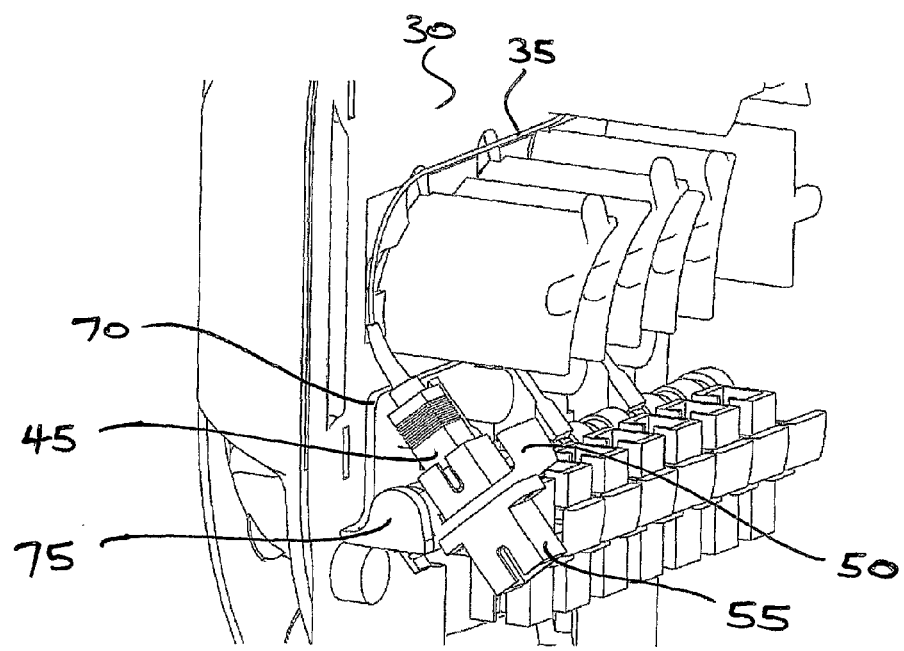
FIG. 2A illustrates a close-up perspective view of part of FIG. 1C.

Referring to FIG. 2A, there is illustrated a close-up perspective view of part of optical fibre joint enclosure 10 as illustrated in FIG. 1C. A Support 70, which includes a support lobe 75, acts to hold carriers 50 to spine 30 whilst allowing carriers 50 to rotate or pivot.

Figure 2B:
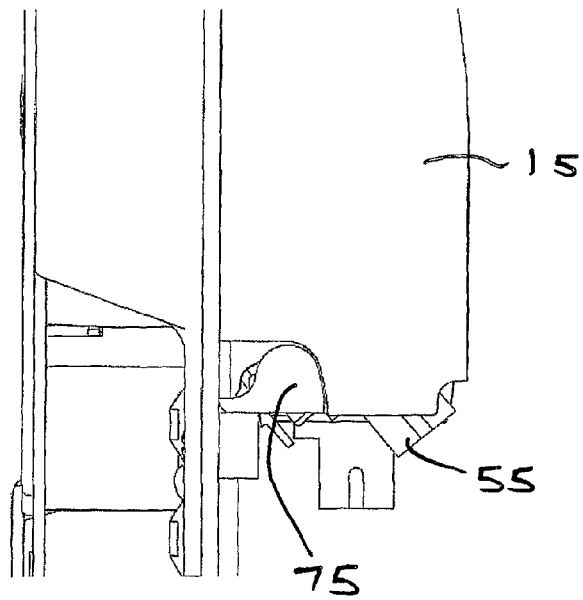
FIG. 2B illustrates a side view of FIG. 2A with the pigtail cover in place.

Referring to FIG. 2B, there is illustrated a side view of the part of optical fibre joint closure 10 illustrated in FIG. 2A i.e. when one carrier 50 is in its rotated position (second position). Pigtail cover 15 is illustrated in place demonstrating how access to an end face of uniter 55 (and thus an end face of connector 45 which is not visible in the figure due to the presence of pigtail cover 15) is still possible when uniter 55 is rotated and pigtail cover 15 is in place.

Figure 2C:
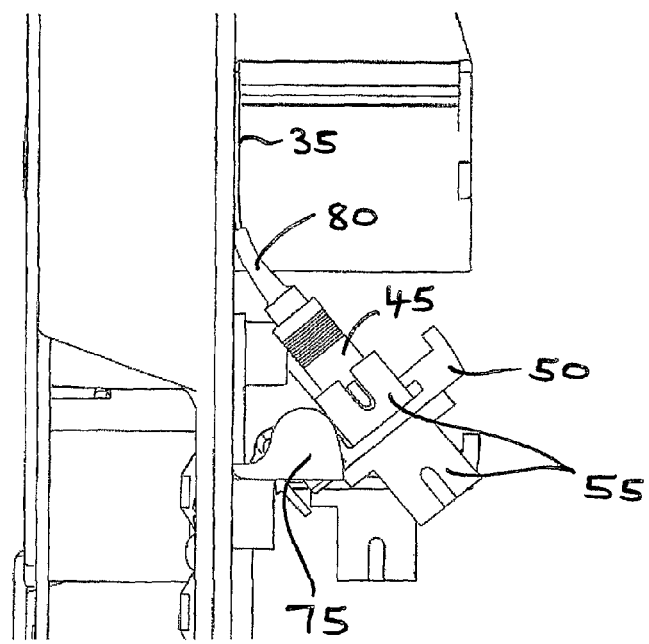
FIG. 2C illustrates a side view of FIG. 2A without the pigtail cover in place.

Referring to FIG. 2C, there is illustrated a side view of the part of optical fibre joint enclosure 10 illustrated in FIG. 2B, but without pigtail cover 15 in place. Clearly visible is the limited bend radius of optical fibre cable 35 in the vicinity of boot 80 which is a component of connector 45. Due to the rotational movement of carrier 50 (associated with adapter 55), boot 80 is caused to be slightly bent. However, since the degree of bending of optical fibre cable 35 internal to boot 80 is limited by the allowable degree of rotation of carrier 50, no damages do occur to the optical fibre(s) contained in the optical fibre cable 35. Moreover, the optical fibre(s) contained within optical fibre cable 35 is(are) protected from damage due to excessive bending by the presence of boot 80. Typically, a minimum bend radius of approximately 40 mm is ensured.

Figure 3:
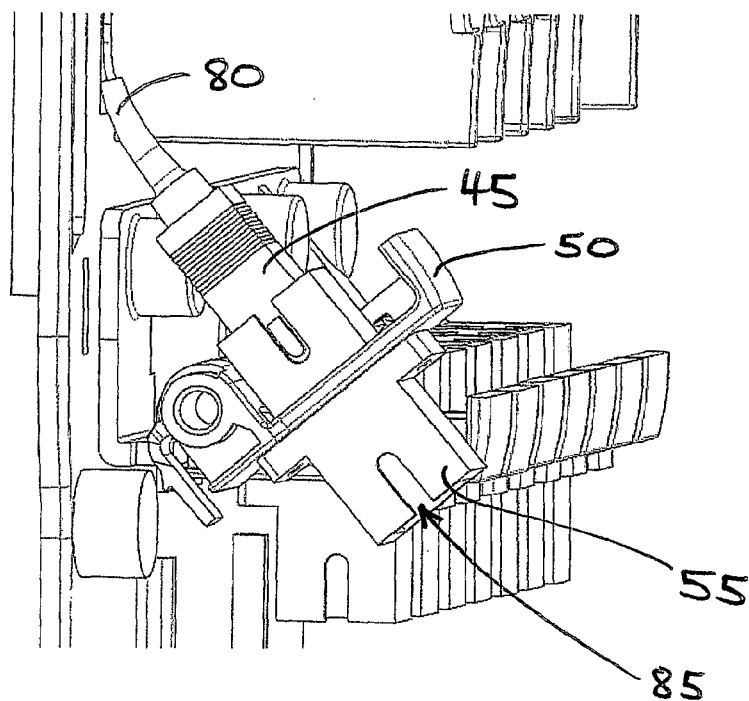
FIG. 3 illustrates a close-up perspective view of part of FIG. 1C with a support lobe of the support holding the carriers removed for clarity.

Referring to FIG. 3, there is illustrated a close-up perspective view of part of optical fibre joint closure 10 with support lobe 75 removed for clarity. Access to an end face of connector 45 is illustrated by direction 85. For example, a standard videoscope can be attached to uniter 55 when carrier 50 is in the illustrated position for inspection of the end face of connector 45.

Referring to FIGS. 4A to 4D, there are illustrated further details of carriers 50 and the operating thereof. Carrier 50 includes a hub portion 90 which, in use, is able to be rotated independently from the hub portions of any adjacent carrier. Carrier 50 also includes an arm portion 100 which is attached to or integrally formed with hub portion 90. Arm portion 100 directly supports connector 45. Alternatively, arm portion 100 indirectly supports connector 45 by receiving and holding uniter 55 which in turn receives and holds connector 45. Carrier 50 also includes a release member 105 which prevents hub portion 90 from rotating unless release member 105 is activated or otherwise released.

According to a preferred embodiment, as illustrated in the figures, hub portion 90 includes a recess 110 (typically a bore) which is suitable for receiving a lobe protrusion 115 protruding from support lobe 75. Lobe protrusion 115 is preferably, though not necessarily, substantially cylindrical and inserts into recess 110, thereby providing a pivotal or rotational axis about which carrier 50 can rotate or pivot.

Arm portion 100 includes a first arm 120 and a second arm 125 that together define an opening 130 that receives uniter 55. Arm portion 100 is also provided with a first tab 135 and a second tab 140 which are located at opposite periphery regions of opening 130 so as to support and hold uniter 55 in arm portion 100. Release member 105 includes a resilient arm 145 that comprises a distal or tab portion 150 and a lip 155 (or other form of protrusion or projection).

Support 70 includes a series of first extensions 160 and second extensions 165, with second extensions 165 extending further than first extensions 160. Preferably, said first and second extensions are in the form of tabs, blocks, lips or the like. First extensions 160 and second extensions 165 are repeated along the base of support 70 to create a stepped or grated structure or arrangement. Lip 155 of release member 105 abuts at least part of a first extension 165 so that carrier 50 cannot rotate or pivot. When tab 150 is forced away from support 70 (for example by a finger of a person), lip 155 disengages with a first extension 160, thereby allowing carrier 50 to rotate about a longitudinal axis of hub portion 90.

Figure 4A:
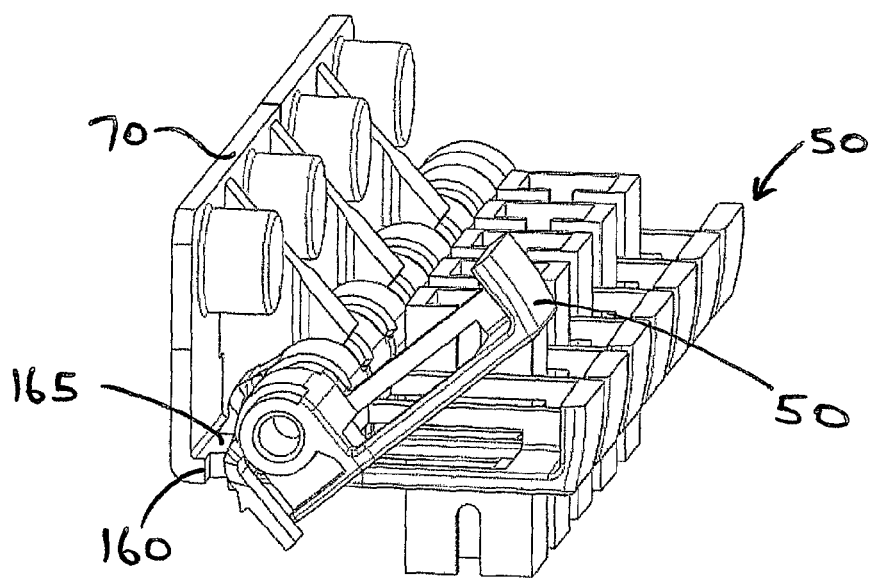
FIG. 4A illustrates a set of carriers in association with a support, with one of the carriers rotated, and a support lobe of the support removed for clarity.
Figure 4B:
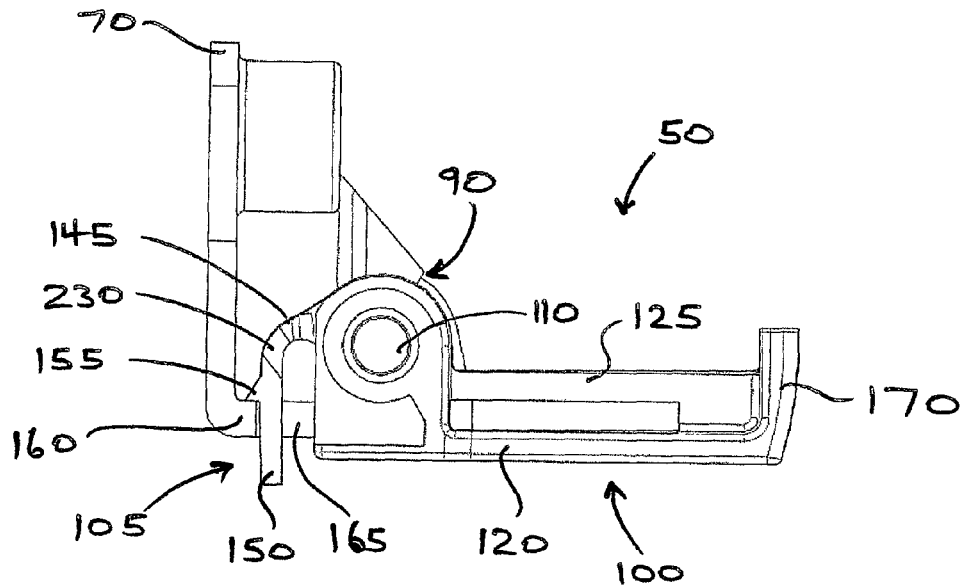
FIG. 4B illustrates a side view of a carrier with a support lobe of the support removed for clarity.
Figure 4C:
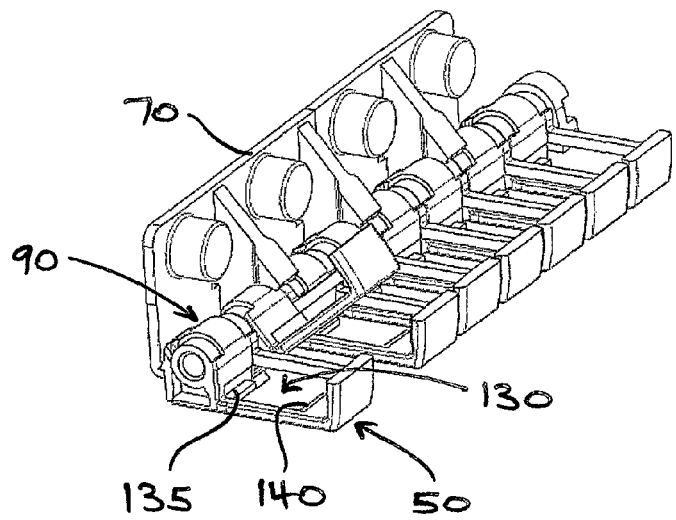
FIG. 4C illustrates a set of carriers in association with a support, with one of the carriers rotated, and a support lobe of the support removed for clarity.

Resilient arm 145 has a rest state illustrated in FIG. 4B, according to which, in the absence of any force applied to tab 150, lip 155 remains in abutment with a first extension 160, thereby preventing unintentional rotation of carrier 50. Arm portion 100 also includes a distal end 170 integrated with or attached to first arm 120 and second arm 125. According to an alternative embodiment, carrier 50 is associated with a spring acting to urge carrier 50 to rotate when release member 105 is activated or released.

Figure 4D:
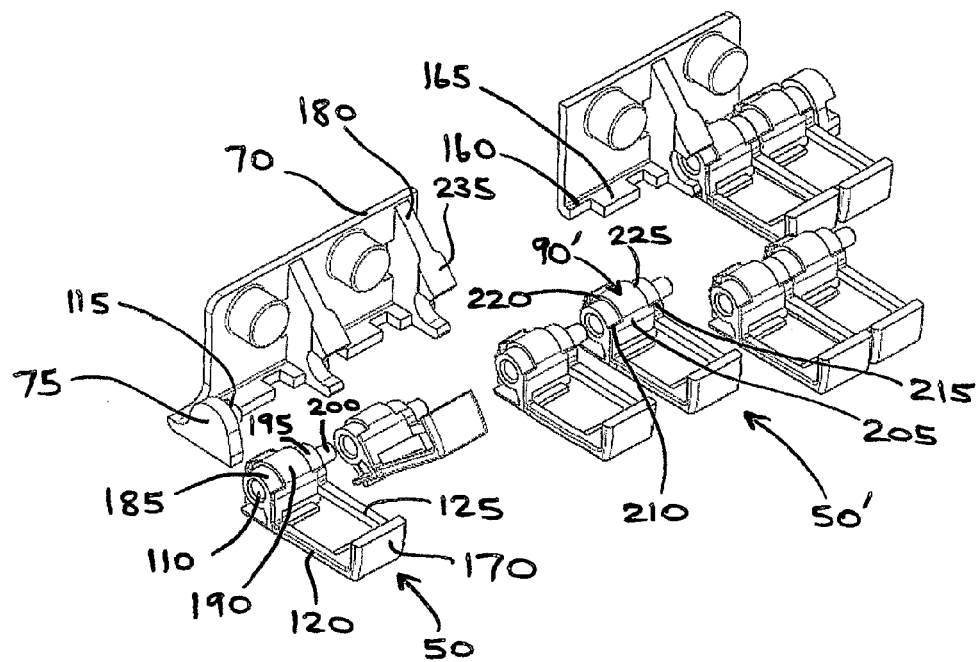
FIG. 4D illustrates an exploded view of a set of carriers in association with a support, with one of the carriers rotated.

Referring more specifically to FIG. 4D, as already mentioned above, support 70 has a stepped or grated structure created by repeated first extensions 160 and second extensions 165 along the longitudinal length of support 70, thus creating a series of notches. Each notch provides space for resilient arm 145 of each carrier 50. Support 70 also includes a series of brackets 180 which provides an additional support to carrier 50 and allows rotation/pivoting thereof. As already mentioned above, support 70 has a support lobe 75 provided with a cylindrical lobe protrusion 115 (with a corresponding support lobe at the other end of support 70) so as to hold carriers 50 in alignment, yet allow each individual carrier 50 to rotate or pivot.

Carrier 50 further includes a first distal cylinder 185, a central cylinder 190 and a second distal cylinder 195. First distal cylinder 185 includes bore 110 while second distal cylinder 195 is attached to protuberance 200. Preferably, first distal cylinder 185, central cylinder 190, second distal cylinder 195 and protuberance 200 are integrally made to form hub portion 90. Bore 110 receives lobe protrusion 115, and protuberance 200 is received by a corresponding bore 110 of adjacent carrier. This arrangement allows carrier 50 to rotate or pivot independent of rotation or pivoting movement of any adjacent carrier.

Referring to carrier 50' of FIG. 4D for ease of reference, the arrangement of hub portion 90'—which is identical to that described for carrier 50—further includes a block portion 205 which creates a first longitudinal step 210 and a second longitudinal step 215. The arrangement of hub portion 90' also results in a first arcuate step 220 and a second arcuate step 225.

According to the embodiment illustrated in the figures, three separate rotation limiting mechanisms are provided to limit carriers 50 to a maximum degree of rotation. Firstly, resilient arm 145 includes a wing protrusion 230 (preferably two wing protrusions, one on either side of resilient arm 145), which is seen in plan view in FIG. 5A. Wing protrusion 230 extends laterally on a side of resilient arm 145 so that when carrier 50 is rotated wing protrusion 230 abuts against at least part of second extension 165 of support 70, thereby limiting rotation of carrier 50.

As a second rotation limiting mechanism, bracket 180 is provided with a bracket wing 235 which extends laterally from a spine of bracket 180. Referring to carrier 50' for ease of reference, when carrier 50' is rotated, first longitudinal step 210 and second longitudinal step 215 rotate about the longitudinal axis of hub 90' to abut against bracket wing 235, thereby preventing further rotation of carrier 50'.

Figure 5A:
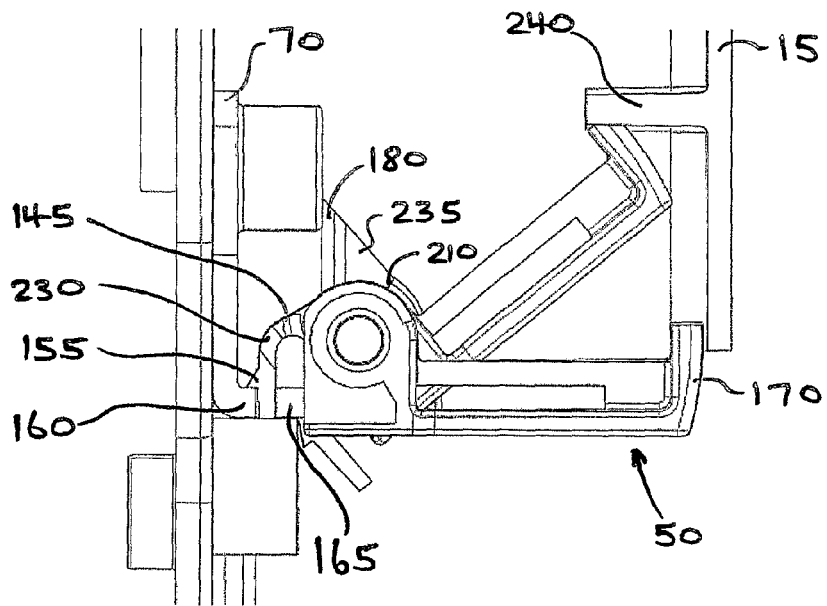
FIG. 5A illustrates a partial cross-sectional view of a set of carriers in association with a support, with one of the carriers rotated, and with the pigtail cover in place.
Figure 5B:
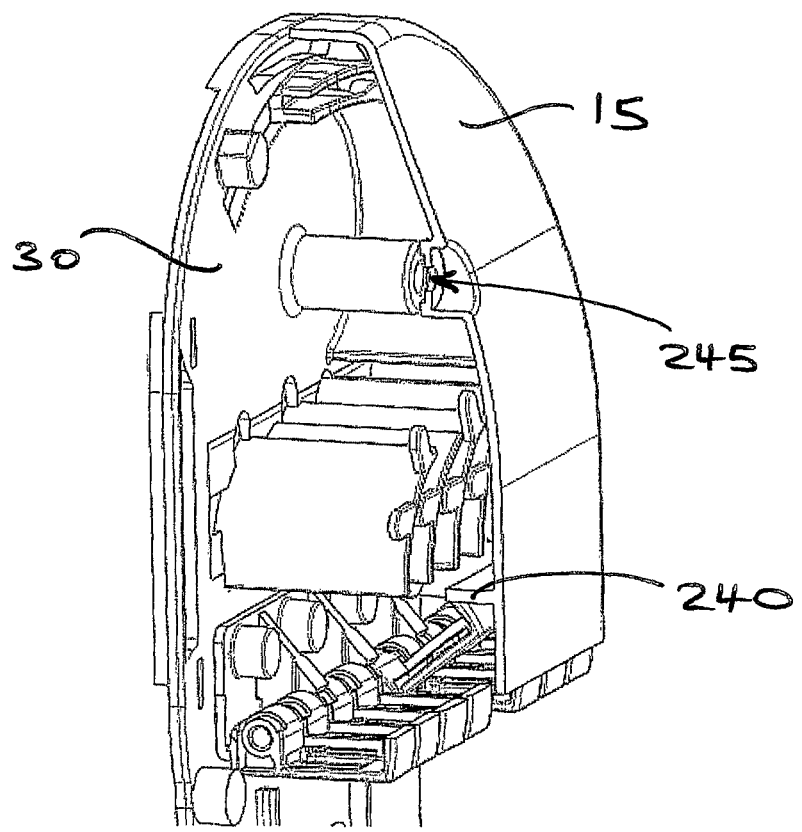
FIG. 5B illustrates a cut-out perspective view of a set of carriers in association with a support, with one of the carriers rotated, and with the pigtail cover partially in place.
Figure 6:
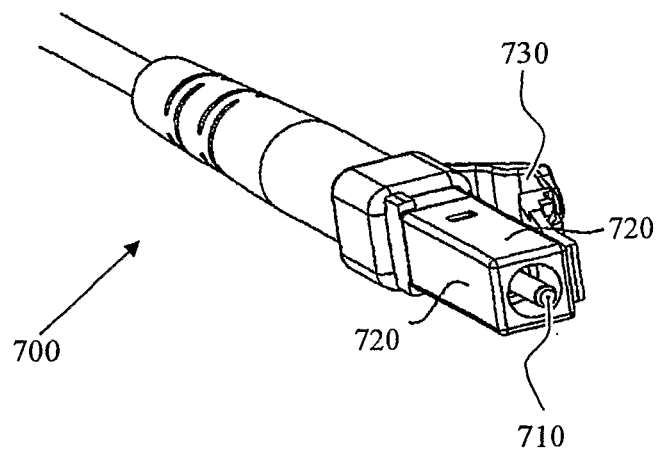
FIG. 6 (prior art) illustrates a typical SC connector.

As a third rotation limiting mechanism, and referring more specifically to FIGS. 5A and 5B, pigtail cover 15 includes a carrier stop bar 240 on the inside surface of pigtail cover 15. If carrier 50 is rotated, then distal end 170 moves into abutment against carrier stop bar 240, as is illustrated in FIG. 5A. Pigtail cover 15 can be releasably held in place by, for example, a threaded bolt or screw being inserted into threaded receiving bore 245 fixed to spine 30.

Preferably, though not necessarily, carrier 50 is produced by injection molding. Preferably, carrier 50 is made of a plastic material. More preferably, carrier 50 is made of a polymeric material. Particularly preferred are polymeric materials are polyethylene and PVC. As discussed previously, uniter 55, or components thereof, are integrally formed with carrier 50.

The present invention provides for a plurality of advantages. Firstly, by allowing an individual connector to be rotated or pivoted, adjacent connectors, for potential or actual subscribers, being adjacent to a connector under consideration, are not involved in inspection, testing, cleaning or the like operations. The Applicant has thought that the solution according to the present invention is better than making the whole carrier pivoting to an angle such that the videoscope can access uniters from the front of the joint enclosure. In fact, since generally not all subscribers drop cables are installed at the same time, in order to inspect any non-connected connectors according to a solution where the whole carrier is pivoted to a given angle, at least one drop cable—already installed and suitably providing a subscriber connection—is caused to be angled together with the non-connected connectors to be inspected, thereby leading to potential damage of the already existing and operating subscribers connections.

Secondly, a suitable or sufficient space for a standard videoscope to be inserted, or to allow sufficient hand access to clean a connector end face, is advantageously provided.

Thirdly, the carriers can be located such that a pigtail cover of the optical fibre joint enclosure does not have to be removed to access a connector end face.

According to the present invention, a hinge unit for a carrier is formed by the combination of the supporting elements 75, 115 and 180 with the locking elements 185, 195, 200 and 110. This hinge unit is advantageously behind the supported uniter. In such way the movement of the connector is such that the connector follows a controlled path, thus managing the bend radius of the optical fibre attached to the connector. Preferably, the connector rotates of an angle which is approximately 40°. Controlled or limited rotation is important so that rotation of a connector does not exert an excessive bending force on an optical fibre which may result in damage to the optical fibre.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The invention claimed is:

1. A method of inspecting an end face of an optical fibre connector of an optical fibre joint enclosure, the optical fibre connector being supported by a carrier, the carrier comprising a hub portion and an arm portion, the optical fibre joint enclosure comprising a plurality of carriers for supporting a respective plurality of optical fibre connectors, the method comprising:
engaging a release member of the carrier with a support for supporting the plurality of optical fibre connectors to prevent the carrier from pivoting;
disengaging the release member from the support to release the release member to allow the carrier to pivot;

pivoting the carrier from a first position to a second position independently from any adjacent carrier of said plurality of carriers; and inspecting the end face of the optical fibre connector in the second position, the optical fiber connector being supported by arm portion of the carrier.

2. The method as claimed in claim 1, further comprising pivoting the carrier from the second position to the first position independently from any adjacent carrier of said plurality of carriers.

3. The method as claimed in claim 1, wherein the second position allows sufficient space for a videoscope to be used for inspecting the end face of the optical fibre connector.

4. The method as claimed in claim 1, wherein the second position allows sufficient space for hand access to inspect the end face of the optical fibre connector.

5. The method as claimed in claim 1, wherein the carrier is pivoted about a distal part of the carrier.

6. An optical fibre joint enclosure comprising:
a plurality of optical fibre connectors;
a support configured to support the plurality of optical fibre connectors; and
a plurality of carriers capable of supporting the plurality of optical fibre connectors, the plurality of carriers including at least one carrier capable of supporting an optical fibre connector of the plurality of optical fibre connectors, the at least one carrier being pivotable between a first position and a second position, independently from any carrier of said plurality of carriers adjacent to said at least one carrier;
wherein the at least one carrier comprises a release member configured to engage the support to prevent the at least one carrier from pivoting and configured to disengage from the support when released to allow the at least one carrier to pivot,
wherein the at least one carrier further comprises a hub portion and an arm portion the arm portion configured to support the optical fibre connector.

7. The optical fibre joint enclosure as claimed in claim 6, wherein the first position defines an in-use orientation of an optical fibre connector and the second position defines a pivoted status which provides an improved access to an end face of the optical fibre connector.

8. The optical fibre joint enclosure as claimed in claim 6, wherein a uniter is attached to the at least one carrier, the uniter being capable of holding the optical fibre connector.

9. The optical fibre joint enclosure as claimed in claim 6, wherein a uniter is integrally formed with the at least one carrier, the uniter being capable of holding the optical fibre connector.

10. The optical fibre joint enclosure as claimed in claim 6, wherein the support is attached to a spine of the optical fibre joint enclosure.

11. The optical fibre joint enclosure as claimed in claim 6, wherein the release member abuts part of the support preventing rotation of the at least one carrier unless the release member is released.

12. The optical fibre joint enclosure as claimed in claim 6, wherein the release member comprises a resilient arm and is capable of being released by applying a force to a tab connected to the resilient arm.

13. The optical fibre joint enclosure as claimed in claim 12, wherein a degree of rotation of the at least one carrier is limited by a protrusion possessed by the resilient arm.

14. The optical fibre joint enclosure as claimed in claim 6, wherein a degree of rotation of the at least one carrier is limited by a step possessed by the hub portion.

15. The optical fibre joint enclosure as claimed in claim 14, wherein the degree of rotation of the at least one carrier is limited by part of the arm portion abutting part of a cover, the cover at least partially covering the plurality of optical fibre connectors.

16. The optical fibre joint enclosure as claimed in claim 6, wherein the at least one carrier is capable of being pivoted about an end portion of the at least one carrier.

17. A carrier for supporting an optical fibre connector in an optical fibre joint enclosure, the carrier comprising:
a hub portion capable of being configured to engage an adjacent hub portion of an adjacent carrier, the hub portion, when in use, capable of being able to rotate independent of rotation of the adjacent hub portion;
an arm portion attached to the hub portion, the arm portion supporting the optical fibre connector; and
a release member capable of preventing the hub portion from rotating unless the release member is released.

18. The carrier as claimed in claim 17, wherein the arm portion comprises an opening to receive a uniter, the uniter being capable of receiving the optical fibre connector.

19. The carrier as claimed in claim 17, wherein a uniter is integrally formed as part of the arm portion, the uniter being capable of receiving the optical fibre connector.

20. The carrier as claimed in claim 17, wherein the arm portion is capable of directly receiving the optical fibre connector.

21. The carrier as claimed in claim 17, wherein the hub portion comprises a first distal cylinder part, a central cylinder part and a second distal cylinder part.

22. The carrier as claimed in claim 21, wherein the first distal cylinder part comprises a bore configured to receive a protuberance of the adjacent carrier.

23. The carrier as claimed in claim 21, wherein the second distal cylinder part comprises a protuberance capable of being received by a bore of the adjacent carrier.

24. The carrier as claimed in claim 17, wherein the release member comprises a resilient arm and is capable of being released by applying a force to the resilient arm.

25. The carrier as claimed in claim 24, wherein the resilient arm comprises a lip.

26. An optical fibre joint enclosure comprising:
a plurality of optical fibre connectors;
a cover at least partially covering the plurality of optical fibre connectors; and
a plurality of carriers capable of supporting the plurality of optical fibre connectors, the plurality of carriers including at least one carrier capable of supporting an optical fibre connector of the plurality of optical fibre connectors, the at least one carrier being pivotable between a first position and a second position, independently from any carrier of said plurality of carriers adjacent to said at least one carrier;
wherein the at least one carrier comprises a hub portion and an arm portion;
wherein the hub portion comprises a step, a degree of rotation of the at least one carrier being limited by the step; and
wherein the degree of rotation of the at least one carrier is limited by part of the arm portion abutting part of the cover.

27. A carrier for supporting an optical fibre connector in an optical fibre joint enclosure, the carrier comprising:
a hub portion capable of being configured to engage an adjacent hub portion of an adjacent carrier, the hub portion, when in use, being rotatable independent of rotation of the adjacent hub portion, the hub portion comprising a distal cylinder part;
an arm portion attached to the hub portion, the arm portion supporting the optical fibre connector; and
a release member capable of preventing the hub portion from rotating unless the release member is released,
wherein the distal cylinder part comprises a protuberance capable of being received by a bore of the adjacent carrier.

28. The optical fibre joint enclosure as claimed in claim 6, wherein the hub portion comprises a distal cylinder part comprising a protuberance received by a corresponding bore of one of the plurality of adjacent carriers.

29. The optical fibre joint enclosure as claimed in claim 6, wherein:
the hub portion comprises a first distal cylinder part, a central cylinder part, and a second distal cylinder part;
the first distal cylinder part comprises a bore; and
the second distal cylinder part comprises a protuberance received by a corresponding bore of one of the plurality of adjacent carriers.

30. The optical fibre joint enclosure as claimed in claim 12, wherein the resilient arm comprises a lip, the lip being configured to abut a part of the support to prevent rotation of the at least one carrier and to disengage from the part of the support when the release member is released.

31. The optical fibre joint enclosure as claimed in claim 13, wherein the protrusion is configured to abut a part of the support to limit the degree of rotation of the at least one carrier.

32. The optical fibre joint enclosure as claimed in claim 14, further comprising a bracket connected to the support, wherein the step is configured to abut the bracket to limit the degree of rotation of the at least one carrier.

33. The optical fibre joint enclosure as claimed in claim 6, wherein:
the hub portion is configured to engage an adjacent hub portion of an adjacent carrier; and
the hub portion is rotatable independent of rotation of the adjacent hub portion when the release member is released.

34. An optical fibre joint enclosure comprising:
a plurality of optical fibre connectors;
a support configured to support the plurality of optical fibre connectors; and
a plurality of carriers capable of supporting the plurality of optical fibre connectors, the plurality of carriers including at least one carrier capable of supporting an optical fibre connector of the plurality of optical fibre connectors, the at least one carrier being pivotable between a first position and a second position, independently from any carrier of said plurality of carriers adjacent to said at least one carrier;
wherein the at least one carrier comprises a release member configured to engage the support to prevent the at least one carrier from pivoting and configured to disengage from the support when released to allow the at least one carrier to pivot;
wherein the at least one carrier further comprises a hub portion configured to engage an adjacent hub portion of an adjacent carrier; and
wherein the hub portion is rotatable independent of rotation of the adjacent hub portion when the release member is released.

35. The optical fibre joint enclosure as claimed in claim 34, wherein the first position defines an in-use orientation of an optical fibre connector and the second position defines a pivoted status which provides an improved access to an end face of the optical fibre connector.

36. The optical fibre joint enclosure as claimed in claim 34, wherein a uniter is attached to the at least one carrier, the uniter being capable of holding the optical fibre connector.

37. The optical fibre joint enclosure as claimed in claim 34, wherein a uniter is integrally formed with the at least one carrier, the uniter being capable of holding the optical fibre connector.

38. The optical fibre joint enclosure as claimed in claim 34, wherein the support is attached to a spine of the optical fibre joint enclosure.

39. The optical fibre joint enclosure as claimed in claim 34, wherein the release member abuts part of the support preventing rotation of the at least one carrier unless the release member is released.

40. The optical fibre joint enclosure as claimed in claim 34, wherein the release member comprises a resilient arm and is capable of being released by applying a force to a tab connected to the resilient arm.

41. The optical fibre joint enclosure as claimed in claim 40, wherein a degree of rotation of the at least one carrier is limited by a protrusion possessed by the resilient arm.

42. The optical fibre joint enclosure as claimed in claim 34, wherein a degree of rotation of the at least one carrier is limited by a step possessed by the hub portion.

43. The optical fibre joint enclosure as claimed in claim 42, wherein:
the at least one carrier further comprises an arm portion configured to support the optical fibre connector; and
the degree of rotation of the at least one carrier is limited by part of the arm portion abutting part of a cover, the cover at least partially covering the plurality of optical fibre connectors.

44. The optical fibre joint enclosure as claimed in claim 34, wherein the at least one carrier is capable of being pivoted about an end portion of the at least one carrier.

45. The optical fibre joint enclosure as claimed in claim 34, wherein the hub portion comprises a distal cylinder part comprising a protuberance received by a corresponding bore of the adjacent carrier.

46. The optical fibre joint enclosure as claimed in claim 34, wherein:
the hub portion comprises a first distal cylinder part, a central cylinder part, and a second distal cylinder part;
the first distal cylinder part comprises a bore; and
the second distal cylinder part comprises a protuberance received by a corresponding bore of the adjacent carrier.

47. The optical fibre joint enclosure as claimed in claim 40, wherein the resilient arm comprises a lip, the lip being configured to abut a part of the support to prevent rotation of the at least one carrier and to disengage from the part of the support when the release member is released.

48. The optical fibre joint enclosure as claimed in claim 41, wherein the protrusion is configured to abut a part of the support to limit the degree of rotation of the at least one carrier.

49. The optical fibre joint enclosure as claimed in claim 42, further comprising a bracket connected to the support, wherein the step is configured to abut the bracket to limit the degree of rotation of the at least one carrier.

* * * * *